United States Patent
Takano et al.

(10) Patent No.: US 9,712,225 B2
(45) Date of Patent: *Jul. 18, 2017

(54) DIGITAL COMBINER FOR PHASED-ARRAY RF RECEIVERS

(71) Applicant: INTERNATIONAL BUSINESS MACHINES CORPORATION, Armonk, NY (US)

(72) Inventors: Kohji Takano, Tokyo (JP); Daiju Nakano, Kanagawa-ken (JP); Yasuteru Kohda, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/272,630

(22) Filed: Sep. 22, 2016

(65) Prior Publication Data

US 2017/0170890 A1 Jun. 15, 2017

Related U.S. Application Data

(63) Continuation of application No. 14/965,566, filed on Dec. 10, 2015, now Pat. No. 9,473,181.

(51) Int. Cl.
  *H04B 7/08* (2006.01)
  *H04B 7/0408* (2017.01)
  *H04B 1/04* (2006.01)

(52) U.S. Cl.
  CPC .............. *H04B 7/0868* (2013.01); *H04B 1/04* (2013.01); *H04B 7/0408* (2013.01)

(58) Field of Classification Search
  CPC . H04B 1/10; H04B 1/709; H04B 1/12; H04B 1/16; H04J 13/0014
  See application file for complete search history.

(56) References Cited

U.S. PATENT DOCUMENTS

| 7,123,882 | B1 | 10/2006 | Fraziere | |
| 7,177,341 | B2* | 2/2007 | McCorkle | H04B 1/69 375/130 |
| 9,473,181 | B1* | 10/2016 | Takano | H04B 1/10 |
| 2008/0092194 | A1* | 4/2008 | Kim | H01Q 25/00 725/131 |
| 2013/0128945 | A1* | 5/2013 | Kent | H04L 25/03038 375/232 |

OTHER PUBLICATIONS

List of IBM Patents or Patent Applications Treated as Related dated Sep. 22, 2016, 2 pages.

* cited by examiner

*Primary Examiner* — Tuan Pham
(74) *Attorney, Agent, or Firm* — Tutunjian & Bitetto, P.C.; Vazken Alexanian

(57) ABSTRACT

Methods and systems for receiving radio frequency (RF) signals include adjusting a digital baseband signal from a first RF front-end to compensate for errors based on a correlation value from a first correlator. A set of digital baseband signals from a set of respective additional RF front-ends is adjusted to compensate for errors based on correlation values from a second correlator. The adjusted digital baseband signal from the first RF front-end and the adjusted set of digital baseband signals from the set of respective additional RF front-ends are combined.

19 Claims, 3 Drawing Sheets

DIGITAL COMBINER FOR PHASED-ARRAY RF RECEIVERS

BACKGROUND

Technical Field

The present invention relates to phased-array radio systems and, in particular, to digital combining methods and systems for phased array radio.

Description of the Related Art

Beam-forming is an important signal processing technique that is used to control the direction of the gain of an antenna or antenna array, focusing the wireless signals to improve signal quality for long-range wireless communication. Beam-forming may be achieved through the use of a phased array antenna, where the antenna incorporates multiple antenna elements, each with a respective front-end. The front-end adjusts the phase and amplitude of the radio frequency (RF) signal being transmitted on or received from the antenna elements. In particular, the phase differences help simulate an antenna array having a shape and orientation that creates constructive interference between the signals of the different antenna elements, strengthening the gain for the phased array.

In a conventional phased array system, an analog phase shifter and an analog amplifier circuit change a phase and an amplitude of each antenna element. Multiple signals, received by each respective element, are combined by analog signal processing into a single signal for subsequent digital baseband processing. If the number of antenna elements in the phased array system is small (e.g., 16), the signal combination can be managed in a single chip. However, if the number of antenna elements is large, it is difficult to combine all of the signals in a single chip using analog processing due to high carrier frequencies, variability of process parameters, difficult delay control among front-ends, and phase jitter among front-ends.

One existing approach to combining signals from the front-ends is to combine the RF signals before conversion to the baseband using, e.g., a Gysel combiner. However, it is difficult to connect large numbers of front-ends in this fashion. In addition, Gysel combiners have a practical lower wavelength limit of about 5 mm, imposing limits on how high the frequency can be.

Another existing approach is to perform local accumulation of front-ends within individual modules and to combine in-phase (I) and quadrature (Q) signals of respective modules after conversion to the baseband using a Wilkinson combiner. However, this approach cannot compensate for phase locked loop jitter. In addition, it has a fixed length, which leads to less flexibility, and needs substantial time to detect the eye-center of each symbol.

SUMMARY

A method for receiving radio frequency (RF) signals includes adjusting a digital baseband signal from a first RF front-end to compensate for errors based on a correlation value from a first correlator. A plurality of digital baseband signals from a plurality of respective additional RF front-ends is adjusted to compensate for errors based on correlation values from a second correlator. The adjusted digital baseband signal from the first RF front-end and the adjusted plurality of digital baseband signals from the plurality of respective additional RF front-ends are combined.

A system for receiving radio frequency (RF) signals includes a plurality of RF front-ends, comprising a first RF front-end and a plurality of additional RF front-ends. A digital baseband circuit is configured to adjust a digital baseband signal from the first RF front-end to compensate for errors based on a correlation value from a first correlator. Each of a plurality of digital combiner circuits is configured to adjust a respective digital baseband signals from a respective additional RF front-end to compensate for errors based on correlation values from a second correlator. A summer is configured to combine the adjusted digital baseband signal from the first RF front-end and the adjusted plurality of digital baseband signals from the plurality of respective digital combiner circuits.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Embodiments of the present invention include digital signal combining to control a phased array. Signals from different modules are combined in the digital baseband domain. Compared with an ideal analog combination of signals implemented by detecting the eye-center of input signals, the present embodiments improve error vector magnitude and can compensate disturbances on a frame-by-frame basis. In addition, a substantial amount of redundancy in circuit components is removed by switching the operation of certain components in a time-sharing manner. The present embodiments provide superior high-frequency signal integrity, lower phase jitter, and less signal degradation from variability.

Figure 1:
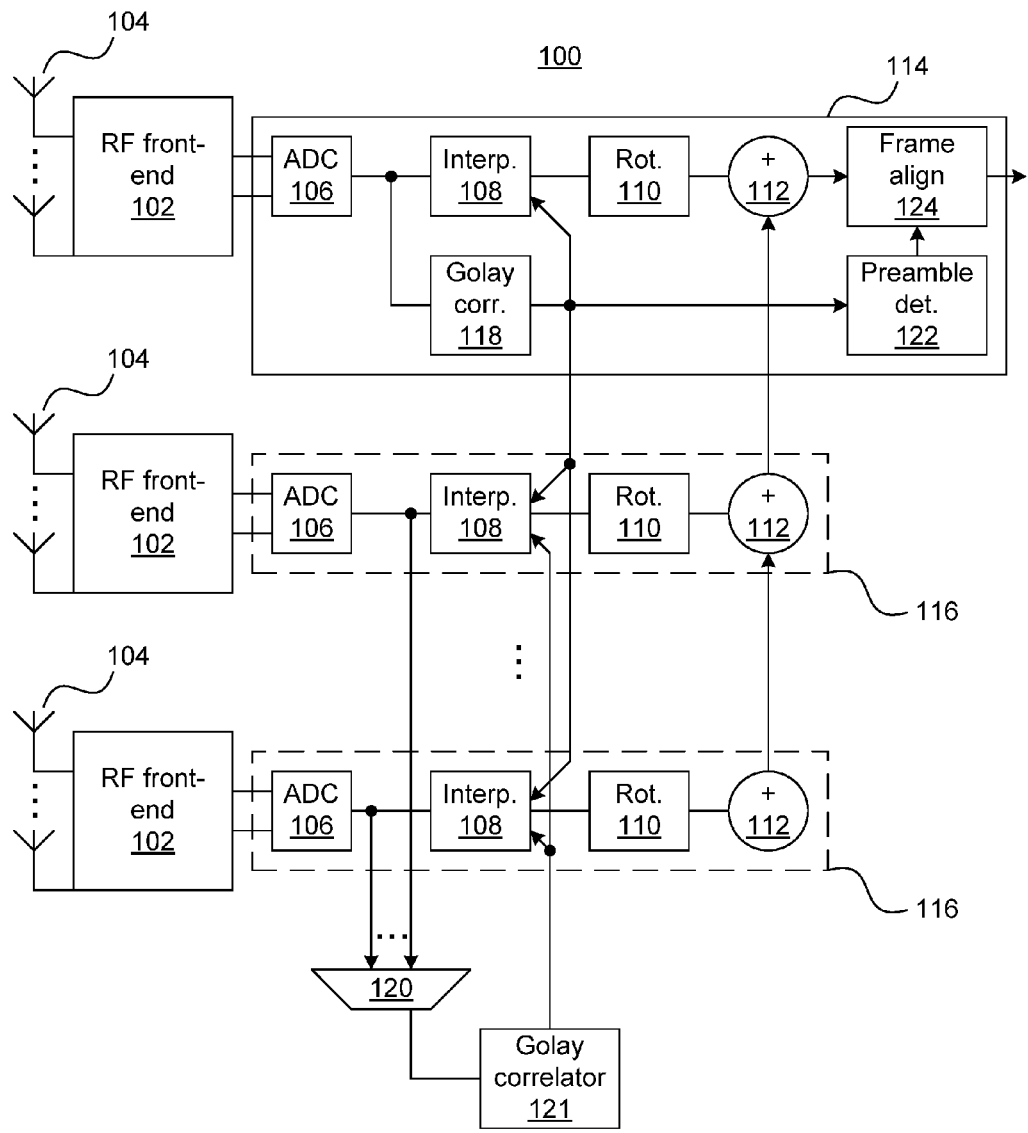
FIG. 1 is a block diagram of a receiver in accordance with the present principles.

Referring now to FIG. 1, a phased array system 100 is shown that adds signals from multiple front-ends 102 in the digital domain. Each front-end 102 communicates with a set of antenna elements 104, controlling the amplitude and gain of each signal sent to and received from each antenna element 104 to produce a beam-steering effect. Multiple front-ends 102 are implemented in parallel, potentially as distinct physical modules, with each front-end 102 outputting a respective baseband signal. When a signal is received on a high-frequency carrier (e.g., a millimeter-wave or terahertz signal) multiple front-ends communicate their outputs to the digital baseband 114, either directly or by digital combiner circuits 116.

The front-ends 102 have an in-phase and quadrature output. The first front-end is processed by a digital baseband unit 114 that is converted to the digital domain at an analog-to-digital converter 106 in the digital baseband 114. The analog-to-digital converter 106 samples the in-phase and quadrature baseband signals in synchronization with a local clock frequency. It should be noted that the local clock frequency need not be the same as the baseband symbol frequency. The analog-to-digital converter 106 produces a sampling offset that arises from the converter's sampling timing and appears as a phase offset in the baseband signal.

An interpolator 108, Golay correlator 118, and rotator 110 synchronize frame timing of the received signal by eliminating timing offsets such as, e.g., arrival timing offset, caused by physical location difference among analog radio frequency (RF) circuits, and sampling timing offset among baseband circuits that derive from an analog-to-digital converter 106 that samples the output circuit of the front-ends 102. The rotator 110 in particular corrects dynamic phase-locked loop (PLL) jitter that results from PLL logic in the analog front-ends 102 by dynamically tracking the carrier phase offset.

The Golay correlator 118 calculates correlation values between the received signal and a known symbol pattern that indicates preamble detection in a wireless frame. The Golay correlator 118 calculates parameters for compensation from the correlation values and the interpolator 108 performs compensation based on the difference of arrival timing among RF front-ends 102 and sampling the timing offset of the analog-to-digital converter 106. The interpolator 108 estimates a phase offset and sampling offset from the baseband signal.

The digital combiner circuits 116 each perform compensation using a respective interpolator 108 and rotator 110. However, for each of the digital combiner circuits 116, shared synchronization logic is used to determine the parameters of each combiner 116 via time sharing. In particular, the digitized outputs of the analog-to-digital converters are sampled one at a time using selector 120 and processed by a second Golay correlator 121. The selector 120 changes the input data in a time-shared manner, ensuring that each of the inputs is compensated.

The Golay correlators 118 and 121 operate by calculating a correlation between received signals and reference signals during a training period. During the training period, a transmitter includes a known pattern as, e.g., the preamble of its transmission. It is specifically contemplated that a Golay code is used herein, but it should be recognized that other codes, such as an M-sequence, may be used instead. The correlators 118 and 121 therefore determine how close the transmitted preamble is to the known pattern and determine a correlation value based on that. The correlation value is used to determine information about sampling timing and phase offsets, which are used for interpolation and frame alignment.

Each of the digital combiner circuits 116 may have different amounts of internal delay. The second Golay correlator 121 is used to help calibrate for these internal delays. During a calibration cycle, the second correlator 121 is connected each of the digital combiner circuits 116 in turn, generating phase delay information for each of the digital combiner circuits 116 that is used to compensate for the internal delays. Because this internal delay is fixed, the second correlator 121 is used only during initialization. After initialization, the first Golay correlator 118 provides further corrections to the digital combiner circuits 116 based on the signals received at the baseband 114, providing global corrections as needed.

After compensation in the interpolators 108 and rotators 110, each digital combiner circuit 116 provides an output that is the sum of its own compensated digital signal and an input from an adjacent digital combiner circuit 116 (if any) provided by summers 112. In this way the digital signals are summed until a final summer 112 in the digital baseband 114 adds the final signal. A preamble determiner in the baseband 122 is used to synchronize and align the frames in block 124 in the baseband 114 before outputting those signals to be equalized using digital filters and de-framed using physical logic.

Figure 2:
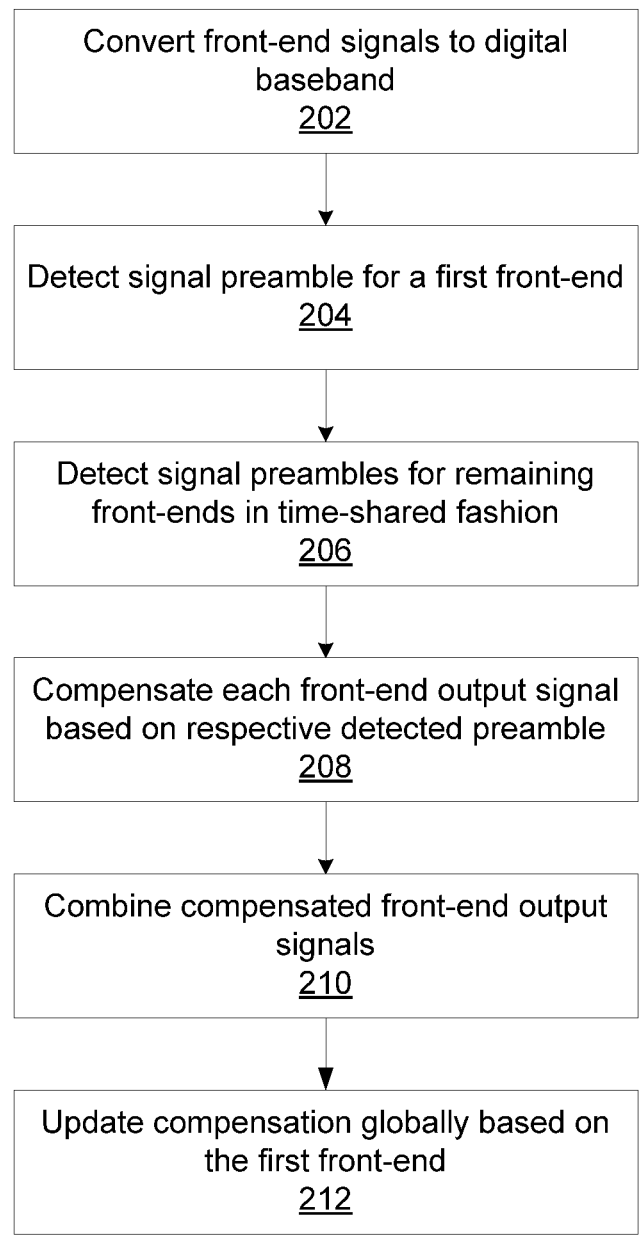
FIG. 2 is a block/flow diagram a method for receiving signals in accordance with the present principles.

Referring now to FIG. 2, a method for receiving a signal from a phased-array system 100 is shown. It is specifically contemplated that this method may be executed during initialization of the phased-array system 100, but the same principles may be employed at any other time as well. Block 202 converts signals received from a set of front-ends 102 into respective digital baseband signals using, e.g., analog-to-digital converters 106. These signals include a preamble that is used to train the phased-array system 100 by matching the preamble to a known pattern.

Block 204 detects the signal preamble for the first front-end 102 using a first Golay correlator 118, while block 206 detects signal preambles for the remaining front-ends 102 in a time-shared fashion using selector 102 and a second Golay correlator 121. Block 206 switches the Golay correlator 121 between different digital combiner circuits 116 using the selector 120, moving to the next after a preamble has been detected and a correlation value has been determined and applied to the respective interpolator 108. Block 208 then compensates each baseband signal for phase errors and other accumulated errors using the respective interpolators 108 and phase rotators 110 before block 210 combines the compensated digital baseband signals using digital summers 112. Going forward, block 212 updates compensation for each of the front-ends 102 based on the first Golay correlator 118. Because the internal delays of the baseband 114 and the digital combiner circuits 116 do not change, they only need to be determined once. However, the received signal may nonetheless drift due to, e.g., multipath issues, frequency mismatch, or phase lock errors. Block 212 tracks these global changes using the first Golay correlator 118 and applies its corrections to each of the interpolators 108.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 3:
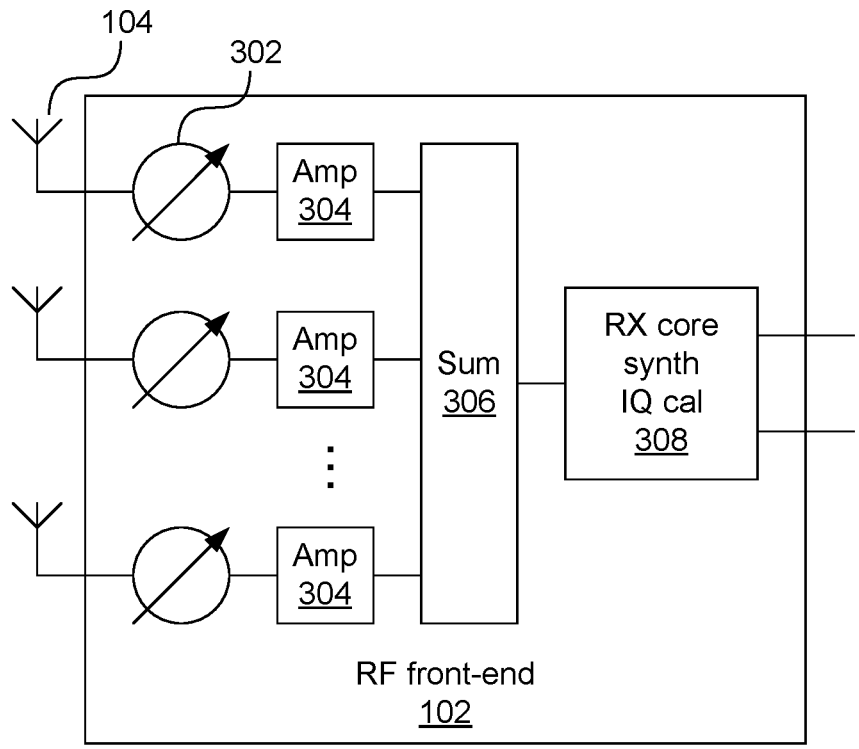
FIG. 3 is a block diagram of a radio front-end in accordance with the present principles.

Referring now to FIG. 3, detail on an individual front-end 102 is shown. Each antenna element 104 receives an RF signal. The RF signal is phase shifted by phase shifter 302 and the gain of the signal is set by amplifier 304 before being summed with the other RF signals from the other antenna elements 104 at summer 306. The summer is an analog adder that accumulates the received RF signals at the RF carrier frequency.

The accumulated signal from summer 306 is converted at receiver core 308. The receiver core takes the high-frequency RF signal and converts it to an intermediate frequency (IF) signal. In one exemplary embodiment, the receiver core 308 may perform super-heterodyne detection and use a clock for the IF that is generated by a local PLL. However, in such a case, the PLL adds phase jitter noise to the output signals. In one particular embodiment, the receiver core 308 breaks the incoming signal into in-phase and quadrature components that form the output of the front-end 102.

Figure 4:
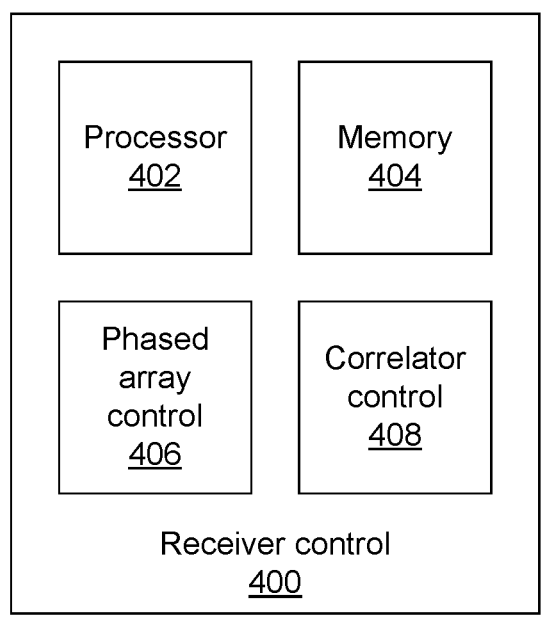
FIG. 4 is a block diagram of a receiver control system in accordance with the present principles.

Referring now to FIG. 4, a receiver control system 400 is shown. The receiver control system 400 includes a hardware processor 402 and memory 404. Additional modules may be implemented as software running on the hardware processor 402 or may, alternatively, be implemented in one or more discrete hardware components as, e.g., application-specific integrated chips or field programmable gate arrays.

The memory 404 may store phased-array settings for the phased-array receiver 100, with a number of different beam patterns being stored along with corresponding phase shift and gain values for the signals received on each respective antenna element 104. A phased array control module 406 uses the stored beam pattern settings to control the front-end 102.

A correlator control 408 provides a selection signal to the selector 120 to govern the second Golay correlator 121 and to ensure that the different signals receive their compensation from their respective interpolators 108 in a time-shared manner. During initialization, the correlator control 408 connects the second Golay correlator 121 to each of the digital combiner circuits 116 in turn, determining and storing information regarding internal delays that arise from, e.g., manufacturing and environmental variations. This information may be stored in the memory 404, to be used by the phased array control 406 as calibration for each of the RF front-ends 102 and for control of the interpolator 108 and phase rotator 110.

Having described preferred embodiments of a digital combiner for phased-array radio frequency receivers (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for receiving radio frequency (RF) signals, comprising:
adjusting a digital baseband signal from a first RF front-end to compensate for errors based on a correlation value from a first correlator;
adjusting a plurality of digital baseband signals from a plurality of respective additional RF front-ends to compensate for errors based on correlation values from a second correlator; and
combining the adjusted digital baseband signal from the first RF front-end and the adjusted plurality of digital baseband signals from the plurality of respective additional RF front-ends.

2. The method of claim 1, wherein adjusting the plurality of digital baseband signals from the plurality of respective additional RF front-ends is performed during an initialization phase.

3. The method of claim 1, wherein adjusting the digital baseband signal from the first RF front-end and the plurality of digital baseband signals from the plurality of respective additional RF front-ends comprises applying the respective correlation values to a respective interpolator and rotator.

4. The method of claim 1, further comprising:
detecting a signal preamble at the first correlator; and
calculating a correlation value between the signal preamble and a predetermined preamble pattern.

5. The method of claim 1, further comprising:
selecting a first of the additional RF front-ends;
detecting a signal preamble from the selected additional RF front-end at the second correlator;
calculating a correlation between the signal preamble and a predetermined preamble pattern; and
repeating said steps of selecting, detecting, and calculating for each remaining additional RF front-end.

6. The method of claim 1, further comprising adjusting the plurality of digital baseband signals from the plurality of respective additional RF front-ends based on correlation values from the first correlator.

7. The method of claim 6, wherein adjusting the plurality of digital baseband signals from the plurality of respective additional RF front-ends is performed after adjustment of said signals based on the second correlator is performed.

8. The method of claim 1, further comprising adjusting a beam pattern of the first RF front-end and the plurality of additional RF front-ends by adjusting a respective phase delay and amplitude of each respective front-end.

9. The method of claim 1, wherein combining the digital baseband signals from the first RF front-end and the plurality of respective additional RF front-ends comprises serially adding each signal to produce a beam-shaped total signal output.

10. A computer readable storage medium comprising a computer readable program for receiving radio frequency signals, wherein the computer readable program when executed on a computer causes the computer to:
adjust a digital baseband signal from a first RF front-end to compensate for errors based on a correlation value from a first correlator;
adjust a plurality of digital baseband signals from a plurality of respective additional RF front-ends to compensate for errors based on correlation values from a second correlator; and
combine the adjusted digital baseband signal from the first RF front-end and the adjusted plurality of digital baseband signals from the plurality of respective additional RF front-ends.

11. A system for receiving radio frequency (RF) signals, comprising:
a plurality of RF front-ends, comprising a first RF front-end and a plurality of additional RF front-ends;
a digital baseband circuit configured to adjust a digital baseband signal from the first RF front-end to compensate for errors based on a correlation value from a first correlator;
a plurality of digital combiner circuits, each configured to adjust a respective digital baseband signals from a respective additional RF front-end to compensate for errors based on correlation values from a second correlator; and a summer configured to combine the adjusted digital baseband signal from the first RF front-end and the adjusted plurality of digital baseband signals from the plurality of respective digital combiner circuits.

12. The system of claim 11, wherein the plurality of digital combiner circuits is configured to adjust adjusting the plurality of respective digital baseband signals during an initialization phase.

13. The system of claim 11, wherein the digital baseband circuit and the plurality of digital combiner circuits are each configured to applying the respective correlation values to a respective interpolator and rotator.

14. The system of claim 11, wherein the digital baseband circuit comprises the first correlator and wherein the first correlator is further configured to detect a signal preamble and to calculate a correlation value between the signal preamble and a predetermined preamble pattern.

15. The system of claim 11, further comprising a selection circuit coupled to the second correlator configured to iteratively select each RF front-end from the plurality of additional RF front-ends and wherein, for each selected front-end, the second correlator is configured to detect a signal preamble from the selected additional RF front-end at the second correlator, and to calculate a correlation between the signal preamble and a known preamble pattern.

16. The system of claim 11, wherein the plurality of digital combiner circuits are further configured to adjust the plurality of digital baseband signals from the plurality of respective additional RF front-ends based on correlation values from the first correlator.

17. The system of claim 16, wherein the plurality of digital combiner circuits are further configured to perform adjustment based on correlation values from the first correlator after adjustment of said signals based on the second correlator is performed.

18. The system of claim 11, further comprising a phased array control configured to adjust a beam pattern of the first RF front-end and the plurality of additional RF front-ends by adjusting a respective phase delay and amplitude of each respective front-end.

19. The system of claim 11, wherein the summer is further configured to serially adding each signal to produce a beam-shaped total signal output.

\* \* \* \* \*